United States Patent [19]
Takei et al.

[11] Patent Number: 6,149,233
[45] Date of Patent: Nov. 21, 2000

[54] HEADREST AND METHOD FOR FORMING THE SAME

[75] Inventors: Yoshiyuki Takei; Takayuki Toriumi, both of Akishima, Japan

[73] Assignee: Tachi-s Co., Ltd., Tokyo, Japan

[21] Appl. No.: 09/468,116

[22] Filed: Dec. 21, 1999

[51] Int. Cl.[7] .................................................. A61G 15/00
[52] U.S. Cl. ......................... 297/220; 297/391; 297/408; 297/DIG. 1
[58] Field of Search ................................... 297/391, 408, 297/220, DIG. 1

[56] References Cited

U.S. PATENT DOCUMENTS

| | | | |
|---|---|---|---|
| 3,650,561 | 3/1972 | Faust et al. | 297/220 |
| 4,848,836 | 7/1989 | Masui | 297/220 |
| 5,681,087 | 10/1997 | Yamano et al. | 297/391 |
| 5,681,088 | 10/1997 | Takei . | |
| 5,967,612 | 10/1999 | Takei | 297/391 |
| 6,068,338 | 5/2000 | Takei et al. | 297/220 |

FOREIGN PATENT DOCUMENTS 8-117056  5/1996  Japan .
8-141232  6/1996  Japan .

*Primary Examiner*—Anthony D Barfield
*Attorney, Agent, or Firm*—Browdy and Neimark

[57] ABSTRACT

A headrest of the type inclinable fore-and-aft with respect to a headrest stay upon a seat, which includes a trim cover assembly having an opening formed at one side thereof, and includes an inclination mechanism connected to the headrest stay within the trim cover assembly. In forming the headrest, an inner sealing enclosure element is provided in the interior of trim cover assembly to accommodate those inclination mechanism and headrest stay therein, with a free part of the headrest stay projecting outwardly through a hole of the inner sealing enclosure element, while one the other hand, an outer sealing element is securely engaged with that inner sealing enclosure element so as to close both opening of the trim cover assembly and hole of the inner sealing enclosure element. This closing and sealing effect is made positive by a particular male and female sealing engagement arrangement defined between the inner sealing enclosure element and outer sealing element. A method for executing such process is provided to attain a sealed structure of headrest which prevents a liquid base foaming material against leakage therefrom during a foaming step.

7 Claims, 4 Drawing Sheets

HEADREST AND METHOD FOR FORMING THE SAME

BACKGROUND OF INVENTION

1. Field of the Invention

The present invention relates to a headrest for use on an automotive seat and a method for forming the same. More particularly, the invention is directed to a headrest of the fore-and-aft inclinable type having an inclining mechanism incorporated therein, wherein the headrest can be inclined forwardly and backwardly of the seat via the inclining mechanism, and also directed to a method for forming that particular type of headrest under a foaming process comprising the steps of injecting a liquid base foaming material into the hollow interior of a trim cover assembly of a predetermined headrest shape, in which the inclining mechanism and a headrest frame with headrest stays have been installed, and curing the injected liquid base foaming material to create and fill a foam padding in the trim cover assembly, integrally together with the inclining mechanism and headrest frame.

2. Description of Prior Art

Among various sorts of headrest for use on an automotive seat, there has been known the fore-and-aft inclinable type of headrest wherein the headrest body thereof can be inclined forwardly and backwardly relative to a headrest stay or seat back of the seat, with a view to allowing a passenger on a rear seat to attain a wide view in the forward direction of automobile by inclining the headrest body forwardly of a front seat on which the headrest is supported via its headrest stay.

This inclining of headrest is adjustably effected via an inclination mechanism incorporated in the headrest body, which is typically composed of a ratchet device for instance. Conventionally, for that purpose, the construction of headrest has been based on a simple layer covering process such that the inclining mechanism is surrounded by a metallic casing layer, then this metallic casing layer is entirely covered with a preformed foam padding layer of a predetermined headrest shape, and finally, the foam padding layer is entirely covered with a there-dimensional covering layer of a given headrest configuration (i.e. a three-dimensional bag-shaped trim cover assembly preformed by sewing together separate cover sections). In most cases, an opening is perforated coaxially through all those layers in order to allow for insertion of headrest frame and headrest stay or entry of worker's hands therethrough into the hollow interior defined therein to form a resulting headrest. Hence, there has been the necessity for a worker to close such opening by means of a particular closing element such as a fastener of Velcro or loop-and-hook fastening type, which renders troublesome the headrest assembling steps on the worker's part and requires a number of parts and lengthy period of time involved. Further, such mere juxtaposition of the three separate layers with one another in this prior-art headrest gives a rise to the drawback that an external force given by a user to the headrest for its inclination purpose causes the top covering layer or trim cover assembly to dislocate from a given position relative to the foam padding layer, resulting in creation of objectionable creases or deformed spots on the outer aesthetic appearance of headrest.

Solution to this problem can be found from such a foaming process as suggested in the Japanese Laid-Open Patent Pub. No. 8-141232, according to which a headrest frame is provided, which surrounds and incorporates a headrest inclination mechanism therewithin and, in assembly, the frame is subjected to foaming with a three-dimensional covering member so as to create a foam padding integrally with and between the headrest frame and covering member. The headrest frame of this prior art is provided with a projected portion with an elongated hole through which a headrest stay movably passes, thereby permitting the headrest frame or headrest body to be inclined fore-and-aft with respect to the headrest stay. The projected portion has a radially extending flange portion formed at its end. The covering member is, therefore, formed with an elongated hole corresponding to that of the projected portion of headrest frame. Prior to a foaming process, a local part of the covering member adjacent such elongated hole is retained between aforesaid radially extending flange portion and an inner wall of foaming die, so that a liquid base foaming material to be injected in the foaming die is prevented against leakage therethrough.

However, even this prior-art headrest structure and foaming procedures have been found defective in terms of incomplete sealing because the flange portion and inner wall of foaming die are simply contacted with each other on a flat plane to retain therebetween the local part of covering member adjacent the elongated hole, which remains of a high likelihood that liquid base foaming material will be invaded or leaked therethrough. Moreover, such arrangement and steps cause a difficulty in quickly locating the headrest frame at a given position within the foaming die in order to insure avoiding the leakage problem.

SUMMARY OF THE INVENTION

In view of the foregoing drawbacks, it is therefore a primary purpose of the present invention to provide an improved headrest of the fore-and-aft inclinable type which is easy to be formed while preventing a liquid base foaming material against leakage during a foaming step involved and without impairing the outer aesthetic appearance of a resulting headrest.

In order to achieve such purpose, a headrest of this type in accordance with the present invention basically comprises:

- a headrest stay means adapted for supporting the headrest upon the seat;
- an inclination mechanism connected to said headrest stay means, which allows the headrest to be adjustably inclined in fore-and-aft direction with respect to the headrest stay means;
- a trim cover assembly of a predetermined headrest shape, which has a hollow interior therein and an opening defined at one side thereof, the opening having an edge portion;
- a sealing enclosure means which is so provided at such opening of trim cover assembly that one part thereof is disposed in the hollow interior of trim cover assembly while another part thereof is disposed outside the trim cover assembly;
- wherein the inclination mechanism and said headrest stay means are accommodated in such one part of sealing enclosure means, with the headrest stay means projecting outwardly through the foregoing another part of sealing enclosure means;
- a foam padding which is created and filled in the hollow interior of trim cover assembly integrally together with the sealing enclosure means by injecting and curing a liquid base foaming material in the hollow interior of trim cover assembly; and wherein the foregoing one part of d sealing enclosure means comprises an inner sealing enclosure element for accommodating the inclination mechanism and a part of said headrest stay means therein, which inner sealing enclosure element has a hole defined at one side thereof, and wherein the foregoing another of sealing enclosure means comprises an outer sealing element having at least one hole through which the headrest stay means projects outwardly, the outer sealing element being to be engaged with the inner sealing enclosure element such as to close the hole of the latter while uniformly pressing the edge portion of opening of trim cover assembly against such one side of said inner sealing enclosure element.

Accordingly, both hole of inner sealing enclosure element and at least one hole of outer sealing element are effectively and quickly sealed against leakage of the liquid base foaming material therethrough, while uniformly retaining the trim cover assembly against dislocation relative to the foam padding.

In one aspect of the present invention, a sealing engagement means is defined between the inner sealing enclosure element and outer sealing element, comprising: a pair of first male and female engagement means provided peripherally of the outer sealing element; and a pair of second male and female engagement means provided around the opening of inner sealing enclosure element, with such an arrangement that the first male engagement means is in a mating engagement relation with the second female engagement means, whereas the first female engagement means is in a mating engagement relation with the second male engagement means. Thus, the outer sealing element can be easily and firmly engaged with said inner sealing enclosure element by engaging the first male and female engagement means with the second female and male engagement means, respectively, so as to close the opening of inner sealing enclosure element while uniformly pressing the edge portion of opening of trim cover assembly against the foregoing one side of inner sealing enclosure element.

It is another purpose of the present invention to provide a method for forming the above-described headrest.

For that purpose, in accordance with the present invention, there is basically provided the steps of:

providing a basic frame unit preformed by connecting together a headrest stay means and an inclination mechanism, wherein the inclination mechanism is adapted for allowing the headrest to be adjustably inclined in the fore-and-aft direction with respect to the headrest stay means;

providing a trim cover assembly of a predetermined headrest shape, which has a hollow interior therein and an opening defined at one side thereof, the opening having an edge portion;

providing a sealing enclosure means which comprises: an inner sealing enclosure element for accommodating the inclination mechanism and a part of the headrest stay means therein, the inner sealing enclosure element having an hole defined at one side thereof; and an outer sealing element having at least one hole through which the headrest stay means projects outwardly, the outer sealing element being to be engaged with the inner sealing enclosure element;

attaching fixedly the basic frame unit within the inner sealing enclosure element, with the headrest frame means projecting outwardly through the hole thereof;

inserting and placing the inner sealing enclosure element in the hollow interior of trim cover assembly, while setting the edge portion of opening of trim cover assembly over both the foregoing one side and hole of inner sealing enclosure element;

then, securely engaging the outer sealing element with the inner sealing enclosure element such as to close the hole of the latter while uniformly pressing the edge portion of opening of trim cover assembly against the foregoing one side of inner sealing enclosure element, thereby positively sealing the hole of inner sealing enclosure element and at least one hole of outer sealing element, to provide a sealed incomplete headrest unit;

placing such sealed incomplete headrest unit in a foaming die means; and injecting and curing a liquid base foaming material in the interior of trim cover assembly of the sealed incomplete headrest unit so as to create a foam padding between the trim cover assembly and inner sealing enclosure element, whereby a final product of headrest is produced, while preventing the liquid base foaming material against leakage through the hole of inner sealing enclosure element and at least one hole of outer sealing element.

Any other features and advantages of the present invention will become apparent from reading of the description hereinafter, with reference to the annexed drawings.

DETAILED DESCRIPTION OF PREFERRED EMBODIMENTS OF THE INVENTION

Referring to FIGS. 1 through 8, there are illustrated, by way of example, one preferred mode of a process for forming a headrest and one preferred mode of the resulting headrest formed thereby, in accordance with the present invention.

Figure 1:
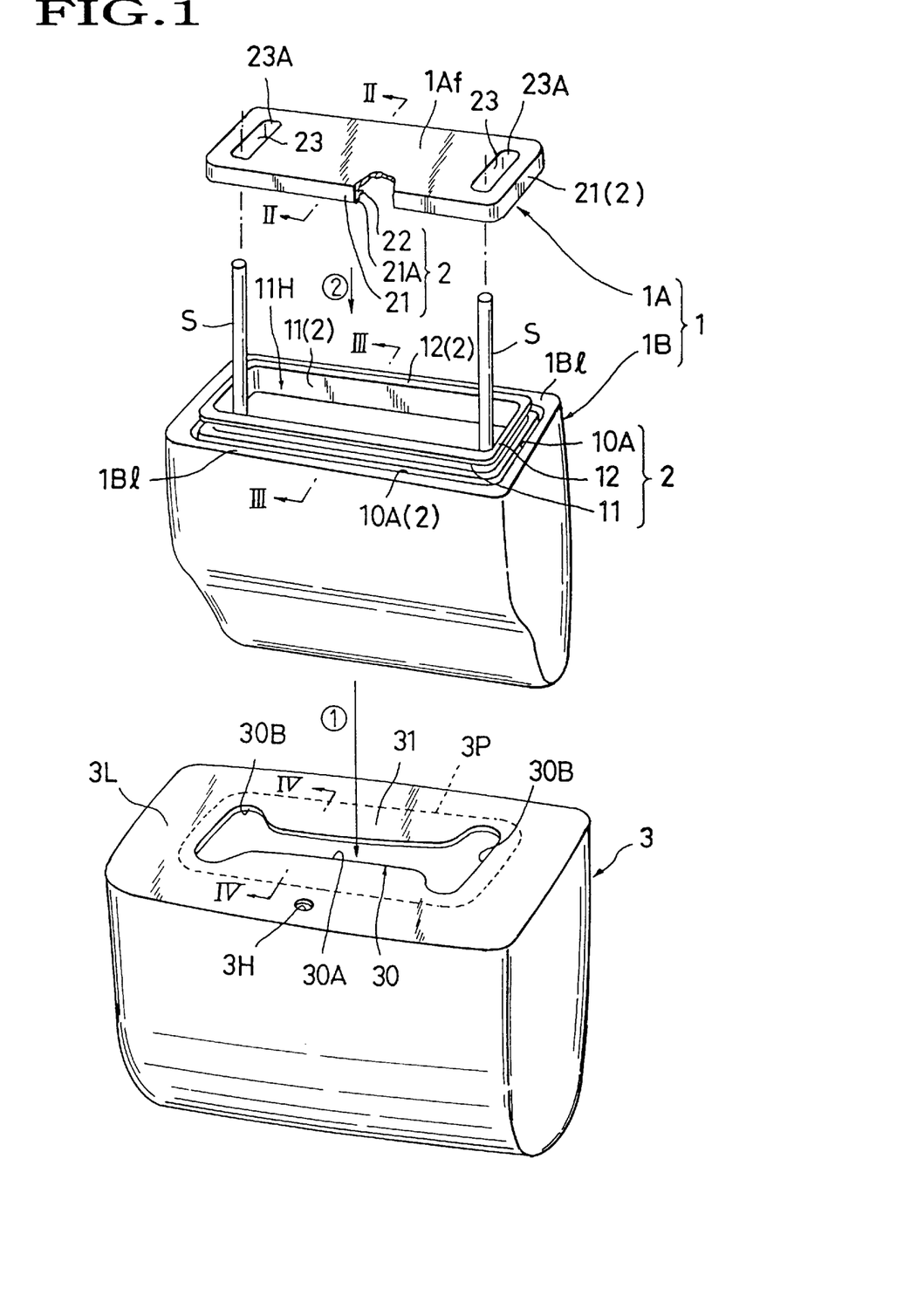
FIG. 1 is a partly broken, schematic exploded perspective view of a sealed incomplete headrest unit, which shows how the sealed incomplete headrest unit is assembled prior to a subsequent foaming step, in accordance with the present invention.
Figure 8:
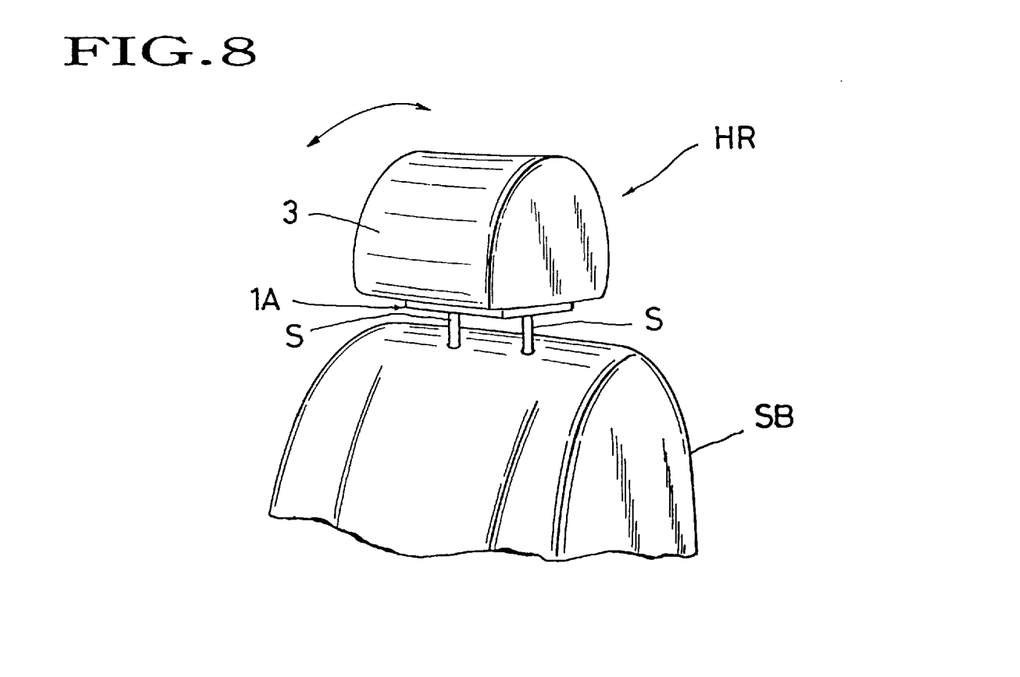
FIG. 8 is a partly broken schematic perspective view showing the resulting headrest as being mounted on a seat back of a seat.

FIGS. 1 and 8 show an exemplary construction of headrest (HR) in accordance with the present invention, which is of the fore-and-aft inclinable type for use on the seat back (SB) of automotive seat. This kind of headrest has, incorporated therein, a known ratchet inclination mechanism, generally designated by (M) in FIG. 5, by means of which the headrest body may be adjustably inclined in the fore-and-aft direction with respect to the two headrest stays (S) or the seat back (SB), so that a passenger on a rear seat can incline the headrest body in the direction forwardly of the seat back (SB) to attain a wide view in the forward direction of an automobile or vehicle.

In accordance with the present invention, a sealing enclosure means (1) is provided to cover and accommodate the foregoing inclination mechanism (M) and a headrest frame (F) (see FIG. 6) therein for the purpose of sealingly covering them and also sealing the opening (30) of trim cover assembly (3) against leakage of a liquid base foaming material therethrough during a foaming process as will be described in detail. As can be seen from FIG. 7, such sealing enclosure means (1) is surrounded integrally with and by a foam padding (P) and a trim cover assembly (3), excepting an outer part thereof (at 1A), under a foaming process so as to form a resultant headrest (HR) of the fore-and-aft inclinable type. Within the broad concept and gist of the present invention, the sealing enclosure means (1) may be embodied by an outer sealing element (1A) to be disposed exteriorly of the trim cover assembly (3), an inner sealing enclosure element (1B) to be disposed interiorly of the trim cover assembly (3) and a sealing engagement means (2) defined in both of those two elements (1A) (1B) in a mutually engagable manner to insure sealing and retaining the trim cover assembly (3) by those two sealing elements (1A) (1B).

As far as the illustrated embodiment is concerned, the inner sealing enclosure element (1B) may be formed from a rigid synthetic resin material in a box-like shape having an opened side at a bottom wall (1B*l*) thereof and a hollow interior defined therewithin. Thus, as understandable from FIGS. 5 and 6, a headrest frame (F), the inclination mechanism (M) and a pair of headrest stays (S) have been assembled together and fixedly accommodated in the hollow interior of the inner sealing enclosure element (1B), with the two stays (S) projecting exteriorly thereof through the opened side. The outer sealing element (1A) may also be formed from a rigid synthetic resin material in a generally cap configuration designed to cover the opened side of the inner sealing enclosure element (1B), having a pair of spaced-apart elongated holes (23A) formed in the flat main body (1A*f*) thereof, through which the two stays (S) passes, respectively, movable along the length-wise direction thereof. The sealing engagement means, as generally designated by (2), is intended to snappingly fix the outer sealing element (1A) over the opened side of inner sealing enclosure element (1B), while providing a positive sealing around the opening (30) of trim cover assembly (3), as will be explained later.

Referring now to FIG. 1, the sealing engagement means (2) may basically comprise: a first engagement region defined on the reverse side of the aforesaid outer sealing element (1A) opposite to the outer wall side (1A*f*) of the same; and a second engagement region with which such first engagement region is to be snappingly engaged, the second engagement region being defined on the bottom wall (1B*l*) of inner sealing enclosure element (1B).

Figure 2:
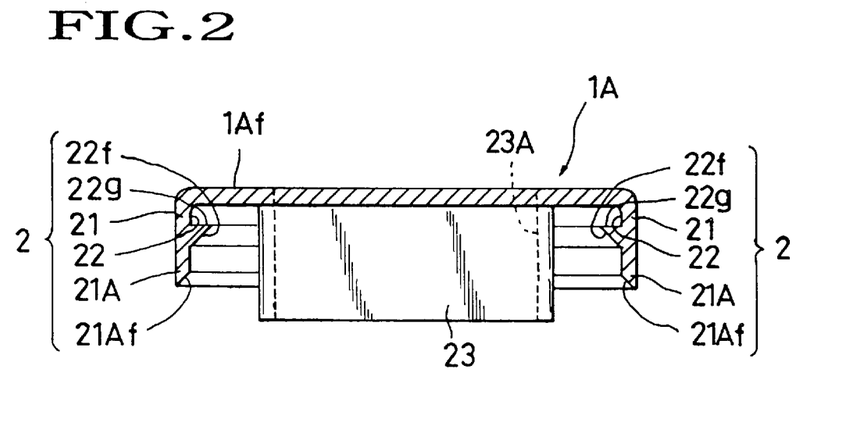
FIG. 2 is a sectional view taken along the line II—II in the FIG. 1.

Specifically, as best shown in FIG. 2, the above-defined first engagement region of sealing engagement means (2) may comprise: a vertically projected male annular part (21) which is formed integrally along the peripheral end of the outer sealing element (1A) such as to extend vertically or dependent therefrom; and a horizontally recessed female annular part (22) which is defined between a tapered annular stopper projection (22*g*) and the inward wall of outer sealing element (1A). The annular stopper projection (22*g*) is of a rigid yet resilient property and projects horizontally from (or at a right angle with) the vertical inward wall of male annular part (21) while extending integrally along the whole inward annular wall of the same (21). As seen from the FIG. 2, the annular stopper projection (22*g*) has a sloped annular guide surface (22*f*) which presents a smooth surface convergent toward the reverse side of outer sealing element (1A), serving a smooth snapping engagement purpose to be explained.

The vertically projected male annular part (21) has a tapered annular end portion (21*f*) presenting a sloped annular surface divergent from the inside of outer sealing element (1A) and terminating in a sharply pointed annular end at and along the outer extreme side of the annular part (21) per se.

Figure 3:
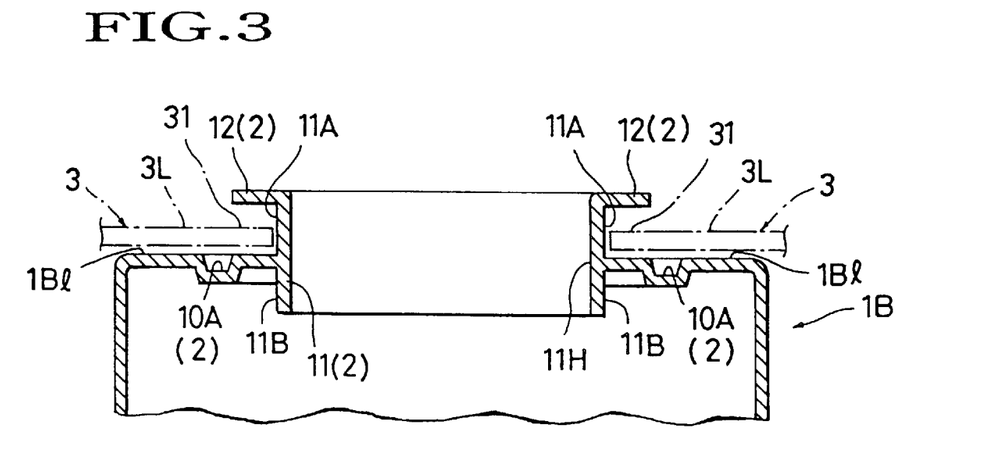
FIG. 3 is a sectional view taken along the line III—III in the FIG. 1.
Figure 4:
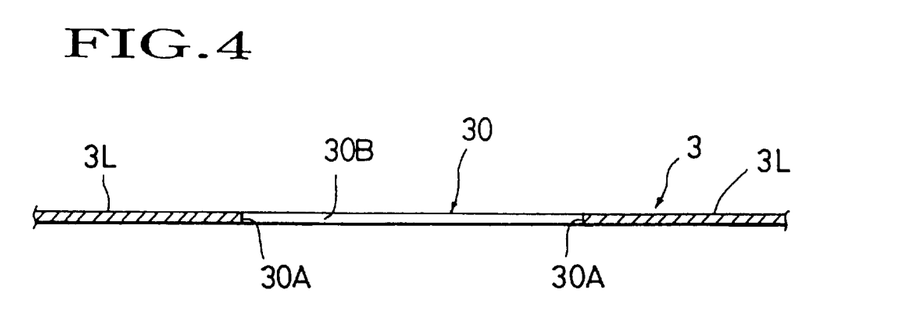
FIG. 4 is a sectional view taken along the line IV—IV in the FIG. 1.

On the other hand, the second engagement region of sealing engagement means (2), as best shown in FIG. 3, may comprise: an annular base portion (11) of a generally cylindrical shape, the intermediate peripheral line of which is integrally connected with the bottom wall (1B*l*) of inner sealing enclosure element (1B), thus defining outer and inner annular half sections (11A) (11B) symmetrically relative to the plane of the bottom wall (1B*l*) and also defining an opening (11H) therethrough; a horizontally projected male annular part (12) formed radially, integrally from the periphery of the top end of that outer annular half section (11A) associated with the annular base portion (11); and a vertically recessed female annular part (10A) which is so defined in the bottom wall (1B*l*) of inner sealing enclosure element (1B) as to circumscribe the annular base portion (11) in an aligned and engagable relationship with the aforesaid vertical male annular part (21). It is noted here that the vertically projected annular part (21) is generally equal in diameter relative to the vertically recessed female annular part (10A), whereas the horizontally projected male annular part (12) has an outer diameter slightly smaller than the inner diameter of vertically projected male annular part (21) but slightly larger than the outer diameter of the annular stopper projection (22*g*).

Designations (23) (23) denote a pair of protuberant shield portions of a generally elliptical cross-section, each being formed dependent from the reverse side of outer sealing element (1A) at a point corresponding to the respective two elongated holes (23A) in the same diametric size with the latter. Such two elongated protuberant shield portions not only act to support the respective two headrest stays (S) being moved therein, but also act as an auxiliary sealing means against leakage of a liquid base foaming material as will be explained later.

The trim cover assembly (3) used in the present invention is of a known three-dimensional shape of a typical headrest contour having a flat bottom wall (3L). Formed in that bottom wall (3L) is a generally H-shaped opening (30) through which the inner sealing enclosure element (1B) can be inserted and placed in the hollow interior of trim cover assembly (3). The opening (30) is of such a diametric size that embracingly contacts the periphery of outer annular half section (11A) of annular base portion (11) formed in the inner sealing enclosure element (1B), which has, defined therein, a pair of elongated opening areas (30B) extending lengthwise of the trim cover assembly (3) and a rectilinear opening area (30A) defined between and communicated with the two elongated opening areas (30B). The generally "H" shape of this opening is effective in providing an increased biasing force to cause its edge to closely contact the whole periphery of outer annular half section (11A) in assembly, thereby enhancing a sealing effect about opening (23H) of annular base portion (11) against leakage of liquid base foaming material during a foaming process to be explained. However, this particular "H" shape is not limitative, but may be of any other shape insofar as it will cause the edge of opening (30) to closely contact the whole periphery of outer annular half section (11A).

Figure 5:
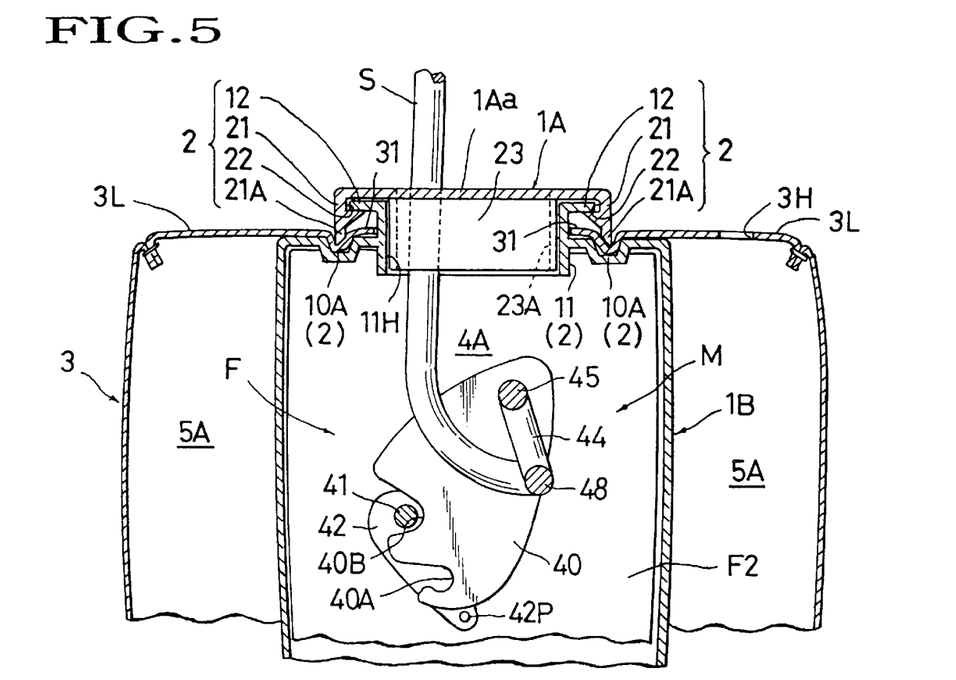
FIG. 5 is a partly broken, fragmentary sectional view of a principal part of the sealed incomplete headrest unit which is assembled.
Figure 6:
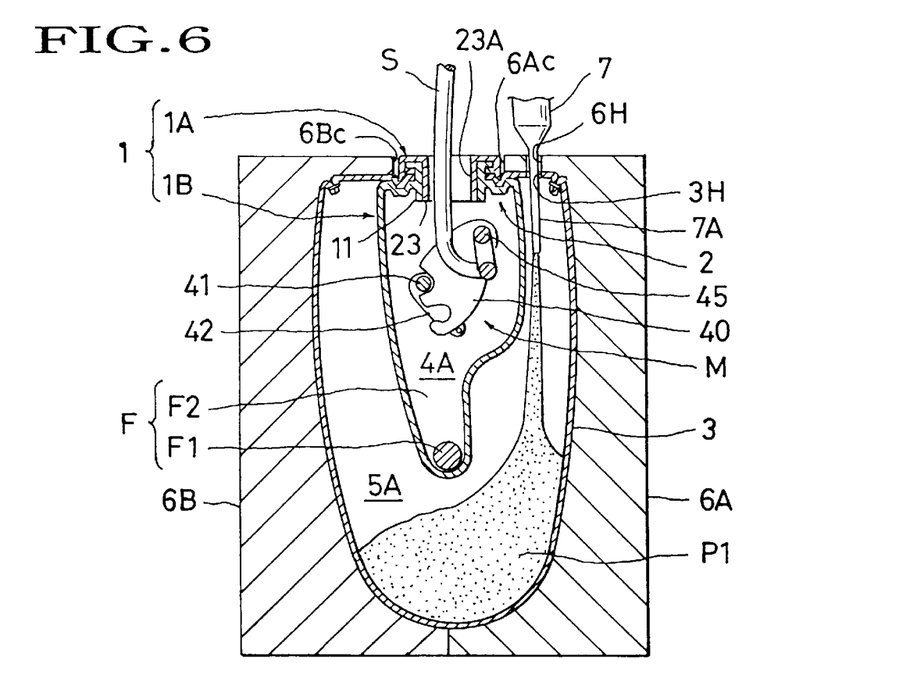
FIG. 6 is a partly broken sectional view showing the state where a liquid base foaming material is injected in a trim cover assembly of the sealed incomplete headrest unit placed in a foaming die.
Figure 7:
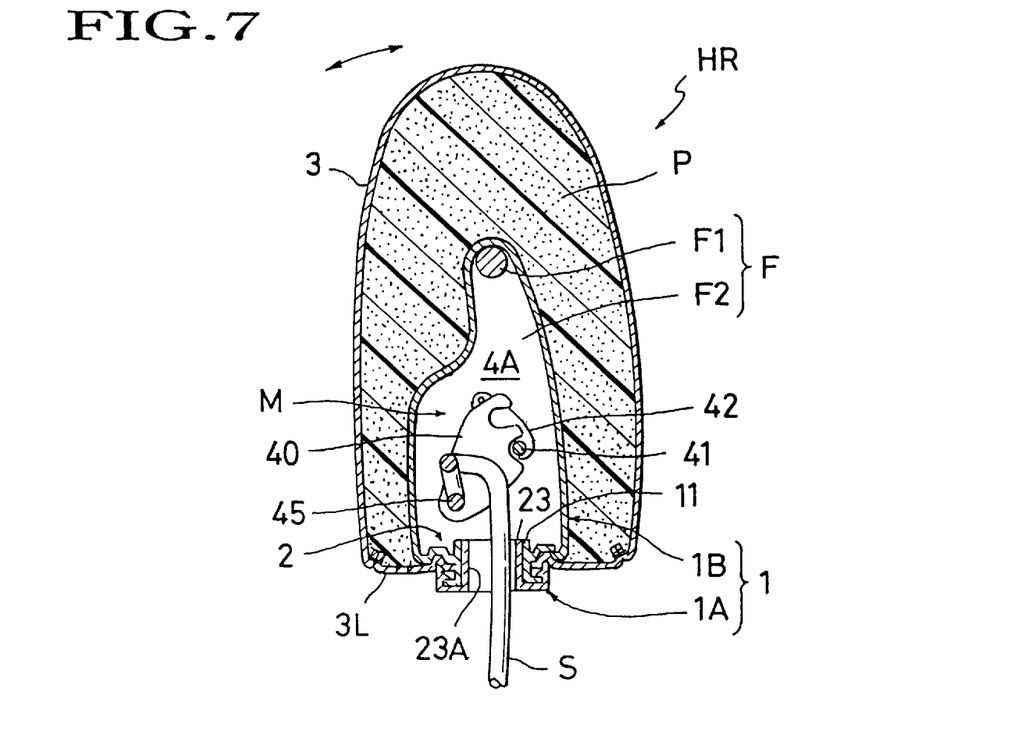
FIG. 7 is a partly broken sectional view of a resulting headrest of fore-and-aft inclinable type in accordance with the present invention.

As understandable from FIGS. 5 to 7, the inclination mechanism (M) is mounted to a headrest frame (F) fixedly attached to the inward wall of the inner sealing enclosure element (1B). The headrest frame (F) is composed of a pair of spaced-apart brackets (F2) and a connecting rod (F1) connected firmly between the two brackets (F2). This headrest frame (F) is fixedly provided within the inner sealing enclosure element (1B) by fixing the two brackets (F2) to the two inward lateral walls of inner sealing enclosure element (1B), respectively.

With particular reference to FIG. 7, the mechanism (M) itself is based on the known ratchet mechanism which comprises: a support shaft (45) fixedly connected between the two brackets (F2) of headrest frame (F) ; a ratchet cam (40) fixed on the support shaft (45), which ratchet cam has two ratchet notches (40A) (40B); and a rotary plate (42) which is pivoted at (42P) to one of the two brackets (F2), having, formed therein, a ratchet pin (41) for selective engagement in one of the two ratchet notches (40A) (40B). Selective engagement of the ratchet pin (41) in one of the two ratchet notches (40A) (40B) will allow the headrest frame (F) or a headrest (HR) to be set at a desired one of forwardly inclined position and normal upright use position, as indicated by the arrow in FIG. 8.

A pair of headrest stays (S) are connected via an arm (44) to the aforesaid support shaft (45) of inclination mechanism (M), so that the headrest frame (F) or inner sealing enclosure element (1B) can be selectively rotated about the support shaft (45) in one of the foregoing two positions with respect to the two headrest stays (S).

Now, description will be made of a method for forming the headrest (HR), using the above-described means and elements hereinafter.

First of all, the inclination mechanism (M) and two headrest stays (S) are pre-assembled together with the frame (F) as stated above in the manner that can be seen from FIGS. 1, 5 and 6, so as to provide a basic frame unit. Then, such basic frame unit is mounted fixedly in the inner sealing enclosure element (1B) by fixing the associated two brackets (F2) to the respective two inner lateral walls of the latter (1B), with the two headrest stays (S) projecting outwardly thereof, as just can be seen from FIG. 1. Since this is a conventional process known in the art, further description thereon is deleted for the sake of simplicity.

Subsequent to those ordinary pre-assembling steps, in accordance with the present invention, as indicated by the arrow ① in FIG. 1, the inner sealing enclosure element (1B) with the above-stated basic frame unit incorporated therein is inserted and set in the interior of trim cover assembly (3) through its opening (30) such that the whole edge of opening (30) of trim cove assembly (3) is contacted with and along the periphery of upper annular half section (11A) of annular base portion (11) associated with the inner sealing enclosure element (1B), as indicated by the one-dot chain line in FIG. 3. In other words, in practice, after having placed the inner sealing enclosure element (1B) within the trim cover assembly (3), a worker has to insert the whole edge of opening (30) fit in and along an annular recession defined between the bottom wall (1Bl) of inner sealing enclosure element (1B) and the horizontally projected male annular part (12) associated with the sealing engagement means (2), as can be seen from the FIG. 3 as well.

Next, as indicated by the arrow ② in FIG. 1, the worker should bring the outer sealing element (1A) toward the horizontally projected male annular part (12) while allowing the two headrest stays (S) to pass through the respective two elongated holes (23A), and then snappingly secure the outer sealing element (1A) over the horizontally projected male annular part (12), thereby closing the opening (11H) while at the same time pressingly sealing the opening (30) of trim cover assembly (3) by way of the sealing engagement means (2). Specifically stated in that respect, when securing the outer sealing element (1A) over the inner sealing enclosure element (1B) on which the trim cover assembly (3) is attached as described above, the annular stopper projection (22g) formed in the outer sealing element (1A) is forcibly pressed against and resiliently deformed or widen radially by the horizontally projected male annular part (12) formed on the inner sealing enclosure element (1B), so that the male annular part (12) smoothly rides over and passes through the thus-deformed annular stopper projection (22g), with the smooth guiding aid of the sloped annular guide surface (22f) thereof, to quickly fit into the horizontally recessed female annular part (22). Thus, the whole male annular part (12) is firmly engaged in and along that recessed annular part (22) against removal therefrom. Simultaneously therewith, the tapered annular end portion (21f) of vertically projected male annular part (21) is uniformly brought to a firm engagement in the whole vertically recessed female annular part (10A), thereby keeping to press and retain a given pressure sealing circle (30P) (see FIG. 1) of trim cover assembly (3) in and along that female annular part (10A) in a uniform manner. Accordingly, as shown in FIG. 5, the opening (30) of trim cover assembly (3) is positively closed and sealed at and along that pressure sealing circular line (30P) against leakage of any liquid material therethrough, and in addition thereto, the firm engagement of the horizontally projected male annular part (12) in the horizontally recessed female annular part (22) provides an embracing sealing over that particular male annular part (12) to positively prevent such leakage as well. That is, in accordance with the present invention, a dual sealing effect or dual leakage preventive effect is attained in the simplified structure and steps to insure complete prevention against any invasion or leakage of liquid material into and out of the sealing enclosure means (1). It is added in this context that, as seen in FIG. 1, the trim cover assembly (3) is preferably provided with a sufficient margin (31) within the pressure sealing circle line (30P) to maintain a biasing close contact of the edges of opening (30) with the whole periphery of upper annular half section (11A) of annular base portion (11), irrespective of a contraction caused in the margin (31) due to a sealing pressure applied thereto by the firm engagement between the male and female parts (22) (10A).

In that manner, as in FIG. 5, while the inner sealing enclosure element (1B) is situated within the trim cover assembly (3), the outer sealing element (1A) is exposed thereon, with the sealing engagement means (2) engaging the two sealing elements (1B) (1A) together to firmly sandwich the peripheral area of trim cover assembly (3) adjacent the opening (30) for the above-noted dual sealing purpose. Thus, a sealed incomplete headrest unit is assembled with the two headrest stays (S) projecting therefrom, as understandable from FIG. 5 in conjunction with FIG. 6.

Such incomplete headrest unit is then placed between the two foaming dies (6A) (6B) as shown in FIG. 6. Designation (6H) denotes a hole formed in the die (6A) in alignment with the hole (3H) formed in the trim cover assembly (3), through which hole (6H), a nozzle portion (7) can be inserted for the purpose of injecting a liquid base foaming material (P1) into the interior of trim cover assembly (3). It is appreciated here that the two foaming dies are simply formed with two securing die sections (6Ac) (6Bc), respectively, excepting their respective working die surfaces for receiving the whole trim cover assembly (3) of the incomplete headrest unit, and that those two securing die sections (6Ac) (6Bc) are simply so formed to closely contact and supportively secure the peripheral side wall of the outer sealing element (1A) exposed on the trim cover assembly (3). This means that the incomplete headrest unit can be easily located and supported at a predetermined position in the forming dies (6A) (6B), with the two headrest stays (S) projecting outwardly from the forming dies as in FIG. 6.

Then, a nozzle portion (7A) of an injection nozzle device (7) is inserted through the two aligned holes (6H) (3H) into the interior (5A) of trim cover assembly (3), and a predetermined amount of liquid base foaming material (P1) is injected from the nozzle portion (7A) thereinto. Thereafter, the liquid base foaming material (P1) is cured within the trim cover assembly (3), increasing its mass to create a foam padding (P) therein. It is to be appreciated that, during the foaming process, the increased mass of liquid base foaming material (P1) being cured is completely prevented not only against leakage through the opening (30) of trim cover assembly (3) as well as through the two holes (23A) of outer sealing element (1A) to the outside of incomplete headrest unit, but also against invasion through the hole (11H) into the hollow space (4A) of inner sealing enclosure element (1B), by the virtue of the above-described dual sealing structure attained by the sealing enclosure means (1)) and sealing engagement means (2).

As can be seen from FIG. 7, the liquid base foaming material (P1) is cured to create and fill a resulting foam padding (P) in the trim cover assembly (3), whereupon there is produced a final product of headrest (HR) of the fore-and-aft inclinable type after having been removed from both two foaming dies (6A) (6B). As shown in FIG. 8, the headrest (HR) is mounted via the two headrest stays (S) upon the seat back (SB) of an automotive seat such as to be adjustably inclined in the fore-and-aft direction with respect to the seat back (SB). In this regard, it is appreciated that the trim cover assembly (3) of this resulting headrest (HR) will not be dislocated relative to the foam padding (P) even when a force is applied thereto by a passenger intending to incline the headrest, by the reason of the fact that the whole circular area (30P) of trim cover assembly (3) surrounding the opening (30) is firmly, uniformly retained between the vertically projected male annular part (21) and the vertically recessed female annular part (10A), thereby keeping to apply a uniform drawing force radially from such circular area (30P) to the whole trim cover assembly (3) as a counter force against the outwardly stretching force being given thereto by the increased mass of elastic foam padding (P). This effectively retains the trim cover assembly (3) at a predetermined point against dislocation relative to the foam padding (P), thus keeping the whole outer appearance of headrest (HR) in an aesthetically good condition.

While having described the present invention thus far, it should be understood that the invention is not limited to the illustrated embodiments, but any other modifications, replacements and additions may be structurally and methodologically applied thereto without departing from the scopes of the appended claims. For instance, the aforementioned margin (31) in the trim cover assembly (3) may be given so large that the whole thereof can be sandwiched and retained by all the annular engagement parts (21, 21A, 22, 22f, 10A) and extend therefrom to the inward space of the hole (11H) such that each of their two length-wise elongated opening areas (30B) substantially contacts and circumscribes the respective two protuberant shield portions (23) with a view to adding a further sealing effect to the above-discussed dual sealing effect.

What is claimed is:

1. A headrest of an inclinable type for use on a seat, comprising:

a headrest stay means adapted for supporting the headrest upon the seat;

an inclination mechanism operatively connected to said headrest stay means, said inclination mechanism allowing the headrest to be adjustably inclined in fore-and-aft direction with respect to the headrest stay means;

a trim cover assembly of a predetermined headrest shape, which has a hollow interior therein and an opening defined at one side thereof, wherein said opening has an edge portion;

a sealing enclosure means which is so provided at said opening of the trim cover assembly that one part thereof is disposed in the hollow interior of said trim cover assembly while another part thereof is disposed outside the trim cover assembly, said inclination mechanism and said headrest stay means being accommodated in said one part of said sealing enclosure means, with said headrest stay means projecting outwardly through another part of said sealing enclosure means;

a foam padding which is created and filled in the hollow interior of said trim cover assembly integrally together with said sealing enclosure means by injecting and curing a liquid base foaming material in the hollow interior of trim cover assembly; and wherein said one part of said sealing enclosure means comprises an inner sealing enclosure element for accommodating said inclination mechanism and a part of said headrest stay means therein, said inner sealing enclosure element having a hole defined at one side thereof, and wherein said another of said sealing enclosure means comprises an outer sealing element having at least one hole through which said headrest stay means projects outwardly, said outer sealing element being to be engaged with said inner sealing enclosure element such as to close said hole of the latter while uniformly pressing said edge portion of the opening of trim cover assembly against said one side of the inner sealing enclosure element, thereby positively sealing said hole of the inner sealing enclosure element and said at least one hole of the outer sealing element against leakage of said liquid base foaming material therethrough.

2. The headrest as defined in claim 1, which further comprises a sealing engagement means defined between said inner sealing enclosure element and said outer sealing element, wherein said sealing engagement means comprises: a pair of first male and female engagement means provided peripherally of said outer sealing element; and a pair of second male and female engagement means provided around said hole of said inner sealing enclosure element, with such an arrangement that said first male engagement means is in a mating engagement relation with said second female engagement means, whereas said first female engagement means is in a mating engagement relation with said second male engagement means, wherein said outer sealing element is firmly engaged with said inner sealing enclosure element by engaging said first male and female engagement means with said second female and male engagement means, respectively, so as to close said hole of the inner sealing enclosure element while uniformly pressing said edge portion of the opening of trim cover assembly against said one side of the inner sealing enclosure element, thereby positively sealing said hole of the inner sealing enclosure and said at least one hole of the outer sealing element against leakage of said liquid base foaming material therethrough.

3. The headrest as defined in claim 1, wherein at least one generally cylindrical protuberant shield portion is formed in said outer sealing element at a point corresponding to said at least one hole of said outer sealing element, in such a manner as to project inwardly of said inner sealing enclosure element, and wherein said opening of the trim cover assembly is so formed to include at least one elongated opening area having an edge portion adapted to substantially contact and circumscribe said at least one generally cylindrical protuberant shield portion.

4. The headrest as defined in claim 1, which further includes a sealing engagement means defined between said inner sealing enclosure element and said outer sealing element, said sealing engagement means comprising:

a stopper means of a rigid yet elastic property which projects inwardly and peripherally of said outer sealing element;

a first female engagement means defined between said stopper means and said outer sealing element;

a first male engagement means provided peripherally of said outer sealing element in a manner dependent therefrom;

a second male engagement means provided peripherally of said hole of said inner sealing enclosure element; and a second female engagement means provided at said inner sealing enclosure element;

wherein said second male engagement means is firmly engaged in said first female engagement means by causing the second male engagement means per se to ride over said stopper means, while said first male engagement means is firmly engaged in said second female engagement means, so as to close said hole of the inner sealing enclosure element while uniformly pressing said edge portion of opening of the trim cover assembly against said one side of said inner sealing enclosure element, thereby positively sealing said hole of the inner sealing enclosure element and said at least one hole of the outer sealing element against leakage of said liquid base foaming material therethrough.

5. The headrest according to claim 4, wherein said first male engagement means comprises a vertically projected male annular part integrally so formed with and along a periphery of said outer sealing element as to project vertically therefrom, wherein said second male engagement means comprises a horizontally projected male annular part so formed above and around said hole of the inner sealing enclosure element as to project horizontally therefrom, and wherein said second female engagement means comprises a vertically recessed female annular part so formed in said inner sealing enclosure element as to lie around said hole thereof in an aligned relation with said vertically projected male annular part.

6. The headrest according to claim 5, wherein said vertically projected male annular part has a tapered annular end portion adapted for insertion and engagement in said vertically recessed female annular part.

7. The headrest according to claim 4, wherein said stopper means comprises a annular stopper projection formed on and along an inward side of said first male engagement means, said annular stopper projection having a tapered end portion with a sloped annular guide surface convergent toward a side where said first female engagement means lies inside of said outer sealing element.

* * * * *